United States Patent
Wu

(10) Patent No.: US 12,118,152 B2
(45) Date of Patent: Oct. 15, 2024

(54) METHOD, DEVICE FOR GESTURE RECOGNITION AND ELECTRONIC EQUIPMENT

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD. (CN)

( * ) Notice: Subject to any disclaimer, the term of this patent is extended or adjusted under 35 U.S.C. 154(b) by 0 days.

(21) Appl. No.: 17/881,130

(22) Filed: Aug. 4, 2022

(65) Prior Publication Data
US 2022/0374086 A1 Nov. 24, 2022

Related U.S. Application Data

(63) Continuation of application No. PCT/CN2021/123609, filed on Oct. 13, 2021.

(30) Foreign Application Priority Data

Mar. 16, 2021 (CN) .......................... 202110282821.9

(51) Int. Cl.
G06F 3/01 (2006.01)
(52) U.S. Cl.
CPC .............. *G06F 3/017* (2013.01); *G06F 3/011* (2013.01)
(58) Field of Classification Search
CPC ......... G06F 3/017; G06F 3/011; G06F 3/0304
See application file for complete search history.

(56) References Cited

U.S. PATENT DOCUMENTS

| | | | |
|---|---|---|---|
| 9,959,296 B1 * | 5/2018 | Gubin | ................... G06F 16/219 |
| 2011/0173204 A1 | 7/2011 | Murillo et al. | |
| 2012/0313847 A1 | 12/2012 | Boda et al. | |
| 2018/0088677 A1 * | 3/2018 | Zhang | ................... G06T 19/006 |

FOREIGN PATENT DOCUMENTS

| | | |
|---|---|---|
| CN | 105302434 A | 2/2016 |
| CN | 105988583 A | 10/2016 |
| CN | 107885317 A | 4/2018 |
| CN | 111273769 A | 6/2020 |
| CN | 111626168 A | 9/2020 |
| CN | 113190106 A | 7/2021 |
| WO | 2018098862 A1 | 6/2018 |
| WO | 2020147434 A1 | 7/2020 |

OTHER PUBLICATIONS

International Search Report issued Jan. 14, 2022 in International Application No. PCT/CN2021/123609.

* cited by examiner

*Primary Examiner* — Andrey Belousov

(57) ABSTRACT

The present application discloses a method, a device for gesture recognition and an electronic equipment. The method includes: receiving a first gesture trajectory input by a user; obtaining a target scene category according to the first gesture trajectory, wherein the target scene category represents a category of an interactive scene in which the user is located; and obtaining one or more target gesture instructions according to the target scene category and the first gesture trajectory.

18 Claims, 1 Drawing Sheet

METHOD, DEVICE FOR GESTURE RECOGNITION AND ELECTRONIC EQUIPMENT

CROSS-REFERENCE TO RELATED APPLICATION

This application is a continuation of PCT International Application No. PCT/CN2021/123609 filed on Oct. 13, 2021, which claims priority to Chinese Patent Application No. 202110282821.9, filed to the China National Intellectual Property Administration on Mar. 16, 2021 and entitled "Method, Device for Gesture Recognition and Electronic Equipment", the content of which is hereby incorporated by reference in its entirety.

TECHNICAL FIELD

The present disclosure relates to the technical field of gesture recognition, and more specifically, to method, device for gesture recognition and electronic equipment.

BACKGROUND

When using electronic equipments involving the technology of virtual reality (VR), augmented reality (AR), and mixed reality (MR), input instructions can be received by collecting and recognizing the gestures from users, thus realize human-computer interaction, providing users with better experience.

At present, there are some defined gestures to be recognized by the electronic equipment. Users need to learn those gestures to ensure the smooth interaction with computers when using the equipment.

Some problems of present gesture recognition, however, emerge in the application: multiple defined gestures may cause wrong and inaccurate recognition for users' poor memory for the gesture or the similarity between the gestures; few types of defined gestures may be insufficient for the interaction in various scenarios, resulting in poor experience of users.

SUMMARY

The present disclosure aims to provide a new technical solution for gesture recognition, to ensure quick and accurate recognition of users' gestures.

According to the first aspect of the present disclosure, there is provided a gesture recognition method, which includes:
  Receiving a first gesture trajectory input by a user;
  Obtaining a target scene category according to the first gesture trajectory, wherein the target scene category represents a category of an interactive scene in which the user is located; and
  Obtaining one or more target gesture instructions according to the target scene category and the first gesture trajectory.

In at least one exemplary embodiment, the process of obtaining the target scene category according to the first gesture trajectory, includes:
  Obtaining a second gesture trajectory input by the user in a preset historical time before the current moment;
  Obtaining a gesture trajectory behavior feature corresponding to the user according to the first gesture trajectory and the second gesture trajectory; and
  Obtaining the target scene category according to the gesture trajectory behavior feature.

In at least one exemplary embodiment, the process of obtaining the target scene category according to the gesture trajectory behavior feature, includes:
  Obtaining at least one gesture instruction to be matched according to the gesture trajectory behavior feature; and
  Performing a query operation in a preset correspondence between scene categories and gesture instructions according to the at least one gesture instruction to be matched, to obtain a scene category that meets a preset condition as the target scene category.

In at least one exemplary embodiment, the process of performing the query operation in the preset correspondence between scenario types and gesture instructions according to the at least one gesture instruction to be matched, to obtain a scene category that meets a preset condition as the target scene category includes:
  Obtaining at least one gesture instruction set according to the correspondence between the scene categories and the gesture instructions, wherein each gesture instruction set corresponds to a scene category;
  Separately calculating the number of instructions that are in the gesture instruction set and match the at least one gesture instruction to be matched, to obtain at least one matching number, wherein each matching number corresponds to a scene category; and
  Selecting out a target matching number that meets the preset numerical condition from the at least one matching number, and taking the scene category corresponding to the target matching number as the target scene category.

In at least one exemplary embodiment, the process of obtaining the target gesture instructions according to the target scene category and the first gesture trajectory, includes:
  Inputting the first gesture trajectory into a gesture recognition model to obtain predicted gesture instructions; and
  Obtaining the target gesture instruction according to the predicted gesture instructions and the target scene category.

In at least one exemplary embodiment, the number of the predicted gesture instructions is more than one, the predicted gesture instructions are output by the gesture recognition model together with a confidence condition corresponding to each gesture instruction;
  Obtaining the target gesture instructions according to the predicted gesture instructions and the target scene category includes:
    Selecting, from the predicted gesture instructions, an instruction whose corresponding scenario category is the target scenario category and whose corresponding confidence condition meets a preset confidence condition as the target gesture instruction.

In at least one exemplary embodiment, a training process of the gesture recognition model includes:
  Obtaining sample data, wherein the sample data is obtained by collecting preset gesture actions, and the preset gesture actions are obtained by making statistics of gesture actions under a preset scene category; and
  Training the gesture recognition model by the sample data, to obtain a gesture recognition model that satisfies a preset convergence condition.

In at least one exemplary embodiment, the method is applied to an electronic equipment, the number of the target gesture instructions is more than one, and after obtaining the target gesture instructions, the method further includes:

Displaying the target gesture instructions;

Receiving a gesture instruction selected by the user from the target gesture instructions; and Making a response corresponding to the selected gesture instruction.

In at least one exemplary embodiment, the preset confidence condition includes: a value of the confidence condition satisfies a preset ranking.

According to the second aspect of the present disclosure, there is also provided a gesture recognition device, including:

A gesture trajectory receiving module, which is configured to receive a first gesture trajectory input by a user;

A scene category obtaining module, which is configured to obtain a target scene category according to the first gesture trajectory, wherein the target scene category represents a category of an interactive scene in which the user is located; and A target gesture instruction obtaining module, which is configured to obtain one or more target gesture instructions according to the target scene category and the first gesture trajectory.

According to the third aspect of the present disclosure, there is also provided an electronic equipment, which includes the device in the second aspect of the present disclosure; or, The electronic equipment includes a memory, which is configured to store executable instructions; a processor, which is configured to run the electronic equipment under the control of the instruction and execute the methods in the first aspect of the present disclosure.

According to the fourth aspect of the present invention, there is provided a computer-readable storage medium, which can be used to store computer programs that could carry out any method in the first aspect of the present disclosure, when run by the processor.

The benefit of the embodiments of the present disclosure is that, the equipment can learn the interactive scene in which the user is located according to the first gesture trajectory input by the user, and then recognize the gesture to obtain the target gesture instruction. Based on the category of the interaction scene and the first gesture trajectory currently input by the user, this method could accurately recognize the target gesture instruction corresponding to the gesture trajectory, so that the electronic equipment can make a corresponding response, thereby enhancing the human-computer interaction experience.

The present invention will now be described with the reference to the accompanying drawings that illustrate the preferred embodiments of the invention, from which the other advantages and features will be evident.

BRIEF DESCRIPTION OF THE DRAWINGS

The drawings incorporated in the specification illustrate the embodiments of the present disclosure, and together with the description thereof, serve to explain the principle of the present disclosure.

DETAILED DESCRIPTION OF THE EMBODIMENTS

Figure 1:
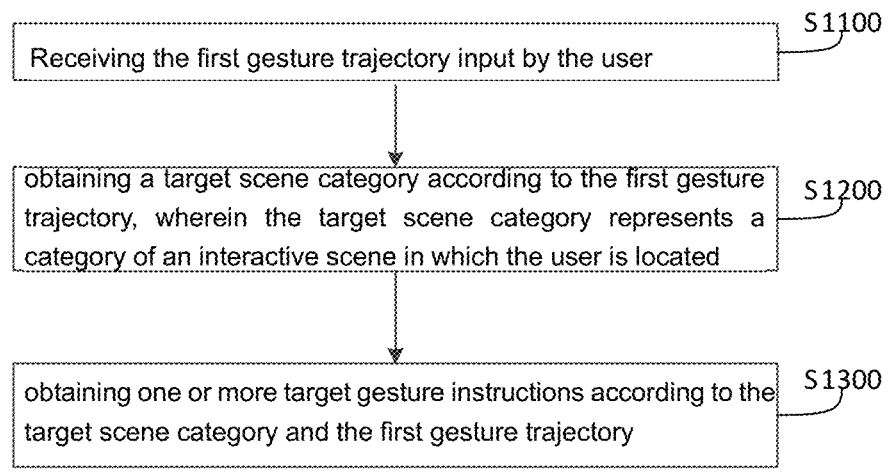
FIG. 1 is a schematic flowchart of a gesture recognition method provided by the embodiment of the present disclosure.

The exemplary embodiments of the present invention will now be described in detail with reference to the accompanying drawings. It should be noted that the components, operation order, numerical expressions and numerical values set forth in these embodiments should not be limited in the scope of the present disclosure, unless specifically stated.

The following description of at least one exemplary embodiment is actually only illustrative, and in no way serves as any limitation to the present invention and its application or usage.

The techniques, methods, and equipment known to those of ordinary skill in relevant fields may not be discussed in detail, which should be regarded as part of the specification where appropriate.

Any specific value should be interpreted as merely exemplary, rather than as a limitation in all the examples shown and discussed herein. Therefore, the exemplary embodiment may have different values in other examples.

It should be noted that similar reference numerals and letters indicate similar items in the following drawings, which do not need to be further discussed in the subsequent drawings if defined in one drawing.

Method Description of the Embodiments

Please refer to FIG. 1, which is a process diagram of a gesture recognition method according to an embodiment of the present invention. The method may be applied to electronic equipment, so that the electronic equipment can quickly and accurately recognize a user gesture so as to obtain a corresponding gesture instruction and make a corresponding response according to the gesture instruction, wherein the electronic equipment may be a server, and the server is configured to receive a user gesture trajectory collected and sent by terminal equipment, and obtain a target gesture instruction according to the gesture trajectory, so as to control the terminal equipment to execute a corresponding response according to the instruction; Or the electronic equipment may be directly terminal equipment, such as VR equipment, AR equipment, and MR equipment, which is not specifically limited herein. It should be noted that unless otherwise specified, the description is made with VR equipment as the electronic equipment applying the method in the embodiment.

As shown in FIG. 1, the method of this embodiment may include the operations S1100-S1300, which are described in detail below.

In operation S1100, a first gesture trajectory input by a user is received.

In this embodiment, the first gesture trajectory may be a trajectory corresponding to a gesture action made by the user at the current moment, and the gesture action may be a gesture action preset in the electronic equipment for inputting a corresponding gesture instruction to the electronic equipment. For example, for an "OK" instruction, the gesture action may be a fist action.

In a specific implementation, the gesture trajectory input by the user may be first acquired through an Image acquisition equipment connected to the electronic equipment. For example, the camera collects a user hand image and analyzes the image. In the VR equipment, the gesture trajectory may be obtained by analyzing the image collected by one or more monochromatic fisheye tracking cameras built in the VR equipment; Of course, in a specific implementation, the gesture trajectory input by the user may also be obtained by other methods. For example, a corresponding sensor may be provided at the hand of the user, and the gesture trajectory input by the user is obtained by analyzing the position information collected by the sensor, which will not be repeated here.

In operation S1200, a target scene category is obtained according to the first gesture trajectory, wherein the target scene category represents a category of an interaction scene in which the user is located.

In the process of implementing the present application, when a user performs human-machine interaction between a gesture and electronic equipment, such as VR equipment, at least one of the following interaction scenes is generally included at the application level: 1. Launcher scene, wherein the scene is generally used to choose an intended application, and the corresponding gesture actions are mainly "choose" and "OK". For example, in VR equipment, a user usually only needs to choose an intended application characterizing the gesture action of "choose" and the gesture action of "OK" under the main menu interface of a VR system; 2. System settings scene, wherein the scene is generally used to browse system settings and click to determine setting contents, and the corresponding gesture actions are mainly "pull-down", "upturned sliding" and "OK"; 3. Video viewing scene, wherein the scene is generally used to determine a video and apply the play control over the video, and the corresponding gesture actions are mainly an "OK" action of choosing to play the video, actions for "pause", "play", "fast forward", "back", "picture zoom", and the like; 4. Webpage browsing scene, wherein the scene is generally used to control webpage content, and the corresponding gesture action are web browsing actions of "pull-down", "upturning", "OK" and the like, as well as content editing actions of "copy", "paste", and the like; 5. Game scene, wherein the scene is mainly a game operation through a corresponding gesture action when a user plays a game; and 6. Photographing scene, wherein the scene may includes some gesture actions for controlling photographing.

According to the above analysis, when a user performs human-machine interaction between a gesture action and electronic equipment, commonly used gesture actions may be determined in different interaction scenes. In this embodiment, in order to accurately identify a user gesture, the number of predefined gesture actions may not necessarily be limited, but the gesture actions in different interaction scenes are counted and classified, a gesture action corresponding to different scene categories may be preset in electronic equipment, such as VR equipment, and when the user performs human-machine interaction with the electronic equipment based on the gesture, the target scene category of the interaction scene where the user is located at the current moment is first determined, then the target gesture instruction is further recognized according to the target scene category. The following describes how to obtain the target scene category.

In an embodiment, the method of obtaining the target scene category according to the first gesture trajectory includes the operations: obtaining a second gesture trajectory inputted by the user in a preset historical time before the current moment; obtaining a gesture trajectory behavior feature corresponding to the user according to the first gesture trajectory and the second gesture trajectory; and obtaining the target scene category according to the gesture trajectory behavior feature.

In the present embodiment, the gesture trajectory behavior feature is data obtained by comprehensively analyzing the first gesture trajectory of the current moment of the user and the second gesture trajectory within the historical duration so as to obtain a gesture trajectory state of the user within a certain duration, and characterizes the behavior or intent of the user.

For example, if the first gesture trajectory at the current moment is a trajectory corresponding to the "fist" action, and at the same time, if the second gesture trajectory within a minute duration before the moment is a trajectory corresponding to the action of "pull-down" and "upturning", it may be determined that the user is browsing the content, and the current interaction scene may be the web browsing scene or the video viewing scene.

In a specific implementation, in order to determine a current moment and a category of an interaction scene where the user is located, specifically, in order to accurately obtain a target scene category, the method of obtaining the target scene category according to the gesture trajectory behavior feature may include the operations: obtaining at least one gesture instruction to be matched according to the gesture trajectory behavior feature; performing a query operation in a preset correspondence between scene categories and gesture instructions according to the at least one gesture instruction to be matched, to obtain a scene category that meets a preset condition as the target scene category.

performing the query operation in the preset correspondence between scenario types and gesture instructions according to the at least one gesture instruction to be matched, to obtain a scene category that meets a preset condition as the target scene category, including: obtaining at least one gesture instruction set according to the correspondence between the scene categories and the gesture instructions, wherein each gesture instruction set corresponds to a scene category; separately calculating the number of instructions that are in the gesture instruction set and match the at least one gesture instruction to be matched, to obtain at least one matching number, wherein each matching number corresponds to a scene category; and selecting out a target matching number that meets the preset numerical condition from the at least one matching number, and taking the scene category corresponding to the target matching number as the target scene category, wherein the scene category corresponding to each gesture instruction set may be a scene category in a preset scene category.

Specifically, after obtaining the gesture trajectory behavior feature characterizing the user gesture trajectory behavior according to the first gesture trajectory and the second gesture trajectory, obtaining some gesture instructions corresponding to the trajectory behavior as the to-be-matched instruction, such as "upturning", "pull-down", "OK" instructions, and the like; and after obtaining the to-be-matched instruction, acquiring the gesture instruction set corresponding to each scene category respectively, and counting the number of gesture instructions matched with the to-be-matched instruction in each gesture instruction set, so that the scene category corresponding to the gesture instruction set with the largest matching number can be used as the target scene category. It should be noted that this is illustrated by using a preset numerical condition as the maximum value of the matching number. In a specific implementation, the preset numerical condition may also be set as required, which is not specifically limited herein.

It should also be noted that the above is merely an embodiment of obtaining a target scene category. In a specific implementation, the target scene category may be obtained by other methods. For example, the convolutional neural model used for obtaining the target scene category according to the gesture trajectory behavior feature may also be pre-trained, which will not be repeated here.

After operation S1200, operation S1300 is executed, and a target gesture instruction is obtained according to the target scene category and the first gesture trajectory.

After determining the scene category of the interaction scene at the current moment of the user through the above operations, the target gesture instruction corresponding to the first gesture trajectory may be obtained according to the scene category and combining the first gesture trajectory inputted at the current moment.

In an embodiment, the method of obtaining a target gesture instruction according to the target scene category and the first gesture trajectory includes the operations: inputting the first gesture trajectory into a gesture recognition model to obtain predicted gesture instructions; and obtaining the target gesture instructions according to the predicted gesture instruction and the target scene category.

In this embodiment, the gesture recognition model is configured to predict a gesture instruction corresponding to the gesture trajectory according to the input gesture trajectory, specifically, prediction gesture instruction. In a specific implementation, the gesture recognition model may be obtained by training through the following operations: Sample data is acquired, wherein the sample data is data obtained by collecting a preset gesture actions, and the preset gesture actions are obtained by counting gesture actions under a preset scene category; and the original gesture recognition model is trained by using the sample data to obtain the gesture recognition model satisfying a preset convergence condition.

Specifically, in the present embodiment, a gesture action corresponding to each interaction scene may be set according to different interaction scenes, such as the six interaction scenes described above, to form a plurality of gesture actions; then, a training data set for training the gesture recognition model is obtained by collecting images or videos of the plurality of gesture actions made by a plurality of users; and then, based on the sample data in the training data set, the original gesture recognition model is trained to obtain a gesture recognition model satisfying a preset convergence condition according to the original gesture recognition model, wherein the original gesture recognition model corresponds to the gesture recognition model, and may be a convolutional neural network-based model. The specific training method thereof will not be repeated here.

In an embodiment, when outputting the prediction gesture instruction, the gesture recognition model also outputs a confidence level corresponding to each prediction gesture instruction at the same time. obtaining the target gesture instruction according to the prediction gesture instruction and the target scene category, including: selecting a corresponding scene category as the target scene category from the prediction gesture instruction, and taking an instruction corresponding to the confidence level satisfying a preset confidence condition as the target gesture instruction.

Specifically, in the present embodiment, the number of the prediction gesture instructions may be multiple. When a gesture instruction corresponding to the gesture trajectory is predicted by the gesture recognition model according to the input gesture trajectory, a plurality of recognition results (20 recognition results) may be output at the same time, and a confidence level corresponding to each recognition result is output at the same time, wherein, the confidence level is used to characterize a confidence interval of a recognition result, specifically, to characterize the accuracy of the recognition result corresponding thereto, and the value range of the confidence interval is generally between 0 and 1. Generally, the larger value indicates the greater accuracy of the recognition result corresponding thereto; after obtaining the plurality of prediction gesture instructions, the prediction gesture instructions are then combined with the target scene category obtained in operation S1200, an instruction belonging to the target scene category and with corresponding confidence level satisfying a preset confidence level condition are selected from the plurality of prediction gesture instructions. For example, an instruction with a maximum numerical value is taken as a target gesture instruction.

It should be noted that, in a specific implementation, in order to further improve the accuracy of the target gesture instruction, the preset confidence level condition may also be: The value of the confidence level satisfies a preset ranking. For example, the value ranks the first 5 in all results.

Specifically, in an embodiment, the number of the target gesture instructions may be multiple. After the target gesture instruction is obtained through the above operations, in order to further improve the accuracy of the gesture instruction, the method further includes the operations: displaying the target gesture instructions; receiving a gesture instruction selected by the user from the target gesture instructions; and making a response corresponding to the selected gesture instruction.

After obtaining the plurality of target gesture instructions, the accuracy of the target gesture instruction is further improved by adding a user confirmation module.

It should be noted that the above is to obtain a prediction gesture instruction according to the gesture recognition model, and combine the prediction gesture instruction with the target scene category to obtain a target gesture instruction. In a specific implementation, when the gesture recognition model is trained, the sample data may also include the scene category corresponding to the gesture action at the same time, so as to train the model of the target gesture instruction according to the gesture trajectory and the scene category; In a specific application, the first gesture trajectory and the target scene category inputted by the user at the current moment may be input into the gesture recognition model at the same time, so that the target gesture instruction may be obtained directly; of course, the target gesture instruction may also be obtained by other methods, which will not be repeated here.

In summary, according to the gesture recognition method provided by the embodiment, after receiving the first gesture trajectory input by the user, the electronic equipment may first determine a target scene category characterizing an interaction scene where the user is located at the current time according to the first gesture trajectory, and then perform gesture recognition according to the target scene category and the first gesture trajectory to obtain a target gesture instruction. According to the method, when gesture recognition is carried out, a target gesture instruction corresponding to the gesture trajectory is accurately recognized by determining the category of the interaction scene where the user is located at the current time and combining the first gesture trajectory input by the user at the current time, so that the electronic equipment can make a corresponding response according to the instruction, and therefore the human-machine interaction experience is further improved.

Device Description of the Embodiments

Figure 2:
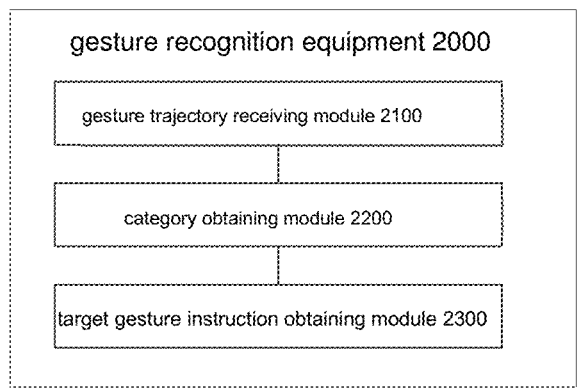
FIG. 2 is a functional block diagram of a gesture recognition device provided by the embodiment of the present disclosure.

To be corresponding to the gesture recognition method provided in the foregoing method embodiment, this embodiment also provides a gesture recognition device. As shown in FIG. 2, the device 2000 can be used in electronic equipment, including the gesture trajectory receiving module 2100, the category obtaining module 2200 and the target gesture instruction obtaining module 2300.

The gesture trajectory receiving module 2100 is configured to receive a first gesture trajectory input by a user;

The scene category obtaining module 2200 is configured to obtain a target scene category according to the first gesture trajectory, wherein the target scene category represents a category of an interactive scene jn which the user is located;

In an embodiment, when obtain target gesture instructions according to the target scene category and the first gesture trajectory, the scene category obtaining module 2200 is further configured to:

obtain a second gesture trajectory input by the user in a preset historical time before the current moment; obtain a gesture trajectory behavior feature corresponding to the user according to the first gesture trajectory and the second gesture trajectory; and obtain the target scene category according to the gesture trajectory behavior feature.

In an embodiment, when obtain the target scene category according to the gesture trajectory behavior feature, the scene category obtaining module 2200 is further configured to: obtain at least one gesture instruction to be matched according to the gesture trajectory behavior feature; and perform a query operation in a preset correspondence between scene categories and gesture instructions according to the at least one gesture instruction to be matched, to obtain a scene category that meets a preset condition as the target scene category.

In an embodiment, when perform the query operation in the preset correspondence between scenario types and gesture instructions according to the at least one gesture instruction to be matched, to obtain a scene category that meets a preset condition as the target scene category, the scene category obtaining module 2200 is further configured to: obtain at least one gesture instruction set according to the correspondence between the scene categories and the gesture instructions, wherein each gesture instruction set corresponds to a scene category; separately calculate the number of instructions that are in the gesture instruction set and match the at least one gesture instruction to be matched, to obtain at least one matching number, wherein each matching number corresponds to a scene category; and select out a target matching number that meets the preset numerical condition from the at least one matching number, and taking the scene category corresponding to the target matching number as the target scene category.

The target gesture instruction obtaining module 2300 is configured to obtain one or more target gesture instructions according to the target scene category and the first gesture trajectory.

In an embodiment, when obtain target gesture instructions according to the target scene category and the first gesture trajectory, the target gesture instruction obtaining module 2300 is further configured to: input the first gesture trajectory into a gesture recognition model to obtain predicted gesture instructions; and obtain the target gesture instructions according to the predicted gesture instructions and the target scene category.

In an embodiment, the number of the predicted gesture instructions is more than one, the predicted gesture instructions are output by the gesture recognition model together with a corresponding confidence condition corresponding to each gesture instruction, the target gesture instruction obtaining module 2300, when obtain the target gesture instructions according to the predicted gesture instructions and the target scene category, is further configured to: select, from the predicted gesture instructions, an instruction whose corresponding scenario category is the target scenario category and whose corresponding confidence condition meets a preset confidence condition as the target gesture instruction.

In an embodiment, the number of the target gesture instructions is more than one, the device 2000 also includes an instruction confirmation module, which is configured to display the target gesture instruction after obtain the target gesture instruction; receive gesture instruction selected in the target gesture instructions by the user, and execute corresponding response according to the gesture instruction selected.

Equipment Description of the Embodiments

To be corresponding to the gesture recognition method provided in the foregoing method embodiments, there is also provided an electronic equipment in this embodiment, which includes the gesture recognition equipment 2000 configured to realize all recognition methods of the present disclosure.

Figure 3:
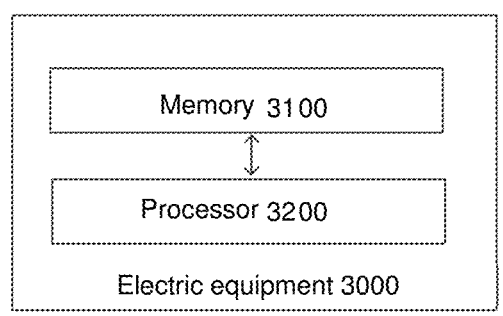
FIG. 3 is a schematic diagram of the hardware structure of the electronic equipment provided by an embodiment of the present disclosure.

As shown in FIG. 3, the electronic equipment 3000 may further include a processor 3200 and a memory 3100. The memory 3100 is configured to store an executable computer program, and the processor 3200 is configured to control the electronic equipment, according to the instructions, to execute the gesture recognition methods in the embodiment of the present disclosure.

The modules of the equipment 2000 can be controlled by the processor 3200 under the instructions, to execute the gesture recognition methods in the embodiment of the present disclosure.

The electronic equipment 3000 can be devices such as VR, AR, and MR devices, with no restrictions here.

The embodiment of the present disclosure also provides a computer-readable storage medium, which is used to store computer programs that could carry out any gesture recognition method in the present disclosure, under the control of the processor.

The embodiments may be a system, method and/or computer program product that includes a computer-readable storage medium loaded with computer-readable program instructions for enabling a processor to realize all procedures of the embodiment.

The computer-readable storage medium may be a tangible device that holds and stores instructions used by the instruction execution device. The computer-readable storage medium may be but not limited to, an electrical storage device, a magnetic storage device, an optical storage device, an electromagnetic storage device, a semiconductor storage device, or any suitable combination of the foregoing. More specifically, the computer-readable storage medium can be (not limited to): portable computer disks, hard disks, random access memory (RAM), read-only memory (ROM), erasable programmable read-only memory (EPROM or flash memory), static random access memory (SRAM), portable compact disk read-only memory (CD-ROM), digital versatile disk (DVD), memory stick, floppy disk, mechanical encoding device, the hole card or the protruding structure in the groove with instructions stored thereon, and any suitable combination of the above. The computer-readable storage medium used herein is not interpreted as a transient signal, such as radio waves or other freely propagating electromagnetic waves, electromagnetic waves propagating through waveguides or other transmission media (like the light pulses propagating through fiber optic cables), or electrical signals propagating through wires.

The computer-readable program instructions described herein can be downloaded from a computer-readable storage medium to computing/processing devices or an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network, and forwards the instructions for storage in their computer-readable storage medium.

The program instructions of the computer to perform all operations of the embodiment can be assembly instructions, instruction set architecture (ISA) instructions, machine instructions, machine-related instructions, microcode, firmware instructions, status setting data, source code or object code written in one type of programming language or several programming languages, which include object-oriented programming languages such as Smalltalk, C++, and conventional procedural programming languages such as C programming language or some other similar. Computer-readable program instructions can be executed entirely or partly on the user's computer, executed as a stand-alone software package, executed both on the user's computer and a remote computer, or entirely on the remote computer or server implement. The remote computer joining the operation can be connected to the user's computer through any kind of network, including a local area network (LAN) or a wide area network (WAN), or it can be connected to an external computer (connect to the user's computer through the Internet). In some embodiments, an electronic circuit can be customized based on the status of the computer-readable program instructions, such as a programmable logic circuit, a field programmable gate array (FPGA) and a programmable logic array (PLA), to realize all aspects of the present disclosure.

All aspects of the present disclosure are now described with reference to flowcharts and/or block diagrams of methods, devices (systems) and computer program products of the embodiments of the present disclosure. It should be learned that contents in each block or the combination of blocks in the flowcharts and/or block diagrams, can be performed by computer-readable program instructions.

These computer-readable program instructions can be provided to the processors of general-purpose computers, special-purpose computers, or other programmable data processing devices, thereby producing a machine that makes these instructions generate a device that implements the functions/actions in one or more blocks in the flowcharts and/or block diagrams, when executed by the processors of the computer or other programmable data processing devices. These instructions, which make computers, programmable data processing apparatuses, and/or other devices work in a specific manner, can also be stored in a computer-readable storage medium. Thus, the computer-readable medium storing the instructions includes a manufacturing package composed of instructions for implementing the functions/actions in one or more blocks in the flowcharts and/or block diagrams.

It is also possible to load computer-readable program instructions on a computer, other programmable data processing device, or other equipment, to execute a series of operation operations in realizing the functions/actions specified in one or more blocks in the flowcharts and/or block diagrams on those devices.

The flowcharts and block diagrams in the accompanying drawings show the system, method, and the architecture, functions and operations possibly completed by the computer program product in the present disclosure. Each block in the flowchart or block diagram may represent a module, program segment, or part of an instruction, which contains one or more executable instructions for realizing the specified logical function. In some alternative implementations, the functions marked in the block may be realized in an order different from that marked in the drawings. For example, functions in two consecutive blocks can actually be executed substantially in parallel, or in the reverse order, depending on the functions involved. It should also be noted that functions in each block or in the combination of the blocks in the block diagram and/or flowchart, can be implemented by both a dedicated hardware-based system that performs the specified functions or actions, and a combination of dedicated hardware and computer instructions. It is well known to those skilled in the art that the embodiment through hardware, through software, or through a combination of both are all equivalent.

The description of embodiments of the present disclosure is exemplary but not exhaustive. And it is not limited to the disclosed embodiments. And it is obvious for those of ordinary skill in the art to find the modifications and changes in the described embodiments, within the scope of this present disclosure. Terms used herein is intended to best explain the principles and practical applications of the embodiments, or technical improvements in the market, and to enable general skilled in the art to understand the embodiments disclosed herein. The scope of the present disclosure is defined by the appended claims.

The invention claimed is:

1. A gesture recognition method, comprising:
 receiving a first gesture trajectory input by a user at a current moment;
 obtaining a second gesture trajectory input by the user in a preset historical time before the current moment;
 obtaining a gesture trajectory behavior feature corresponding to the user according to the first gesture trajectory and the second gesture trajectory, wherein the gesture trajectory behavior feature is data that characterizes the behavior or intent of the user and is derived from a gesture trajectory state of the user within a certain duration obtained by comprehensively analyzing the first gesture trajectory of the current moment of the user and the second gesture trajectory within a historical duration;
 obtaining a target scene category according to the gesture trajectory behavior feature, wherein the target scene category represents a category of an interactive scene in which the user is located;
 obtaining one or more target gesture instructions according to the target scene category and the first gesture trajectory.

2. The method according to claim 1, wherein obtaining the target scene category according to the gesture trajectory behavior feature comprises:

obtaining at least one gesture instruction to be matched according to the gesture trajectory behavior feature; and performing a query operation in a preset correspondence between scene categories and gesture instructions according to the at least one gesture instruction to be matched, to obtain a scene category that meets a preset condition as the target scene category.

3. The method according to claim 2, wherein performing the query operation in the preset correspondence between scenario types and gesture instructions according to the at least one gesture instruction to be matched, to obtain a scene category that meets a preset condition as the target scene category comprises:

obtaining at least one gesture instruction set according to the correspondence between the scene categories and the gesture instructions, wherein each gesture instruction set corresponds to a scene category;

separately calculating the number of instructions that are in the gesture instruction set and match the at least one gesture instruction to be matched, to obtain at least one matching number, wherein each matching number corresponds to a scene category; and selecting out a target matching number that meets the preset numerical condition from the at least one matching number, and taking the scene category corresponding to the target matching number as the target scene category.

4. The method according to claim 1, wherein obtaining the target gesture instructions according to the target scene category and the first gesture trajectory comprises:

inputting the first gesture trajectory into a gesture recognition model to obtain predicted gesture instructions; and obtaining the target gesture instructions according to the predicted gesture instructions and the target scene category.

5. The method according to claim 4, wherein the number of the predicted gesture instructions is more than one, the predicted gesture instructions are output by the gesture recognition model together with a confidence condition corresponding to each gesture instruction;

obtaining the target gesture instructions according to the predicted gesture instructions and the target scene category comprises:

selecting, from the predicted gesture instructions, an instruction whose corresponding scenario category is the target scenario category and whose corresponding confidence condition meets a preset confidence condition as the target gesture instruction.

6. The method according to claim 4, wherein a training process of the gesture recognition model comprises:

obtaining sample data, wherein the sample data is obtained by collecting preset gesture actions, and the preset gesture actions are obtained by making statistics of gesture actions under a preset scene category; and training the gesture recognition model by the sample data, to obtain a gesture recognition model that satisfies a preset convergence condition.

7. The method according to claim 1, wherein the method is applied to an electronic equipment, the number of the target gesture instructions is more than one, and after obtaining the target gesture instructions, the method further comprises:

displaying the target gesture instructions;

receiving a gesture instruction selected by the user from the target gesture instructions; and making a response corresponding to the selected gesture instruction.

8. The method according to claim 5, wherein the preset confidence condition comprises: a value of the confidence condition satisfies a preset ranking.

9. A gesture recognition device, comprises a memory storing instructions and a processor in communication with the memory, wherein the processor is configured to execute the instructions to:

receive a first gesture trajectory input by a user at a current moment;

obtain a second gesture trajectory input by the user in a preset historical time before the current moment;

obtain a gesture trajectory behavior feature corresponding to the user according to the first gesture trajectory and the second gesture trajectory, wherein the gesture trajectory behavior feature is data that characterizes the behavior or intent of the user and is derived from a gesture trajectory state of the user within a certain duration obtained by comprehensively analyzing the first gesture trajectory of the current moment of the user and the second gesture trajectory within a historical duration;

obtain a target scene category according to the gesture trajectory behavior feature, wherein the target scene category represents a category of an interactive scene in which the user is located; and obtain one or more target gesture instructions according to the target scene category and the first gesture trajectory.

10. An electronic equipment, wherein the equipment comprises:

A memory, which is configured to store executable instructions; and

A processor, which is configured to run the electronic equipment under the control of the instruction and execute the method of claim 1.

11. A non-transitory computer-readable storage medium, which is used to store computer programs that could carry out the method of claim 1 when run by the processor.

12. The device according to claim 9, wherein the processor, when obtain the target scene category according to the gesture trajectory behavior feature, is further configured to:

obtain at least one gesture instruction to be matched according to the gesture trajectory behavior feature; and perform a query operation in a preset correspondence between scene categories and gesture instructions according to the at least one gesture instruction to be matched, to obtain a scene category that meets a preset condition as the target scene category.

13. The device according to claim 12, wherein the processor, when perform the query operation in the preset correspondence between scenario types and gesture instructions according to the at least one gesture instruction to be matched, to obtain a scene category that meets a preset condition as the target scene category, is further configured to:

obtain at least one gesture instruction set according to the correspondence between the scene categories and the gesture instructions, wherein each gesture instruction set corresponds to a scene category;

separately calculate the number of instructions that are in the gesture instruction set and match the at least one gesture instruction to be matched, to obtain at least one matching number, wherein each matching number corresponds to a scene category; and select out a target matching number that meets the preset numerical condition from the at least one matching number, and taking the scene category corresponding to the target matching number as the target scene category.

14. The device according to claim 9, wherein the processor, when obtain target gesture instructions according to the target scene category and the first gesture trajectory, is further configured to:

input the first gesture trajectory into a gesture recognition model to obtain predicted gesture instructions; and obtain the target gesture instructions according to the predicted gesture instructions and the target scene category.

15. The device according to claim 14, wherein the number of the predicted gesture instructions is more than one, the predicted gesture instructions are output by the gesture recognition model together with a corresponding confidence condition corresponding to each gesture instruction, the processor, when obtain the target gesture instructions according to the predicted gesture instructions and the target scene category, is further configured to:

select, from the predicted gesture instructions, an instruction whose corresponding scenario category is the target scenario category and whose corresponding confidence condition meets a preset confidence condition as the target gesture instruction.

16. The device according to claim 14, wherein a training process of the gesture recognition model comprises:

obtaining sample data, wherein the sample data is obtained by collecting preset gesture actions, and the preset gesture actions are obtained by making statistics of gesture actions under a preset scene category; and training the gesture recognition model by the sample data, to obtain a gesture recognition model that satisfies a preset convergence condition.

17. The device according to claim 9, wherein the number of the target gesture instructions is more than one, after obtaining the target gesture instructions, the processor is further configured to:

display the target gesture instructions;

receive a gesture instruction selected by the user from the target gesture instructions; and make a response corresponding to the selected gesture instruction.

18. The device according to claim 15, wherein the preset confidence condition comprises: a value of the confidence condition satisfies a preset ranking.

* * * * *